US011827117B2

(12) United States Patent
Khamis et al.

(10) Patent No.: US 11,827,117 B2
(45) Date of Patent: Nov. 28, 2023

(54) INTELLIGENT CHARGING SYSTEMS AND CONTROL LOGIC FOR CROWDSOURCED VEHICLE ENERGY TRANSFER

(71) Applicant: GM GLOBAL TECHNOLOGY OPERATIONS LLC, Detroit, MI (US)

(72) Inventors: Alaa M. Khamis, Courtice (CA); Ramzi Abdelmoula, Whitby (CA); Vyacheslav Berezin, Newmarket (CA); Arief B. Koesdwiady, Oshawa (CA); Pedro E. Villanueva Pena, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 17/519,866

(22) Filed: Nov. 5, 2021

(65) Prior Publication Data

US 2023/0144986 A1 May 11, 2023

(51) Int. Cl.
*G06Q 30/00* (2023.01)
*B60L 53/66* (2019.01)
*G06Q 30/08* (2012.01)
*B60L 55/00* (2019.01)
*B60L 53/30* (2019.01)

(52) U.S. Cl.
CPC .......... *B60L 53/665* (2019.02); *B60L 53/305* (2019.02); *B60L 55/00* (2019.02); *G06Q 30/08* (2013.01)

(58) Field of Classification Search
None
See application file for complete search history.

(56) References Cited

U.S. PATENT DOCUMENTS

| 5,642,270 A | 6/1997 | Green et al. |
| 6,275,004 B1 | 8/2001 | Tamai et al. |
| 7,401,047 B2 * | 7/2008 | Yokoo ................... G06Q 40/04 |
| | | 705/37 |

(Continued)

OTHER PUBLICATIONS

Sayyad Nojavan et al. "Optimal energy pricing for consumers by electricity retailer", Electrical Power and Energy Systems 102 (2018) 401-412, © 2018 Elsevier Ltd. (Year: 2018).*

(Continued)

*Primary Examiner* — Naeem U Haq
(74) *Attorney, Agent, or Firm* — Quinn IP Law

(57) ABSTRACT

Presented are intelligent charging systems for transferring energy to and from motor vehicles, methods for making/operating such systems, and vehicles with V2V and V2G energy transfer capabilities. A method for operating an intelligent charging system includes a system controller receiving, from a user interface of a user, a request to schedule a transfer of electricity to the user. The system controller broadcasts to a crowdsourced set of service providers a solicitation for energy transfer bids for completing the user's transfer request. After receiving multiple bid submissions for completing the transfer request from multiple service providers, the system controller selects an optimized one of the bid submissions using a multi-criteria selection strategy. The multi-criteria selection strategy includes a joint utility maximization function and/or a trade-off Pareto solution. The system controller transmits to the service provider associated with the optimized bid submission a task allocation with instructions to provide the transfer request.

20 Claims, 5 Drawing Sheets

(56) References Cited

U.S. PATENT DOCUMENTS

| | | | |
|---|---|---|---|
| 7,810,476 | B2 | 10/2010 | Wang et al. |
| 8,091,416 | B2 | 1/2012 | Wang et al. |
| 8,201,444 | B2 | 6/2012 | Wang et al. |
| 8,276,373 | B2 | 10/2012 | Wang et al. |
| 8,392,091 | B2 | 3/2013 | Hebbale et al. |
| 8,565,949 | B2 | 10/2013 | Christman et al. |
| 8,612,119 | B2 | 12/2013 | Wang et al. |
| 8,694,197 | B2 | 4/2014 | Rajagopalan et al. |
| 9,058,578 | B2 | 6/2015 | Jones et al. |
| 9,133,750 | B2 | 9/2015 | Levijoki et al. |
| 9,142,980 | B2 | 9/2015 | Lee |
| 9,153,980 | B2 | 10/2015 | Restrepo et al. |
| 9,365,124 | B2 | 6/2016 | Soden et al. |
| 9,660,462 | B2 | 5/2017 | Jeon |
| 9,718,371 | B2 | 8/2017 | Anglin et al. |
| 9,963,038 | B2 | 5/2018 | Parra Ortiz et al. |
| 10,688,881 | B2 | 6/2020 | Tarnowsky et al. |
| 11,091,055 | B2 * | 8/2021 | Tarchinski .............. B60L 55/00 |
| 2008/0051973 | A1 | 2/2008 | Gangopadhyay et al. |
| 2008/0265835 | A1 | 10/2008 | Reed et al. |
| 2008/0284385 | A1 | 11/2008 | Namuduri et al. |
| 2009/0030712 | A1 | 1/2009 | Bogolea et al. |
| 2010/0198754 | A1 | 8/2010 | Jones et al. |
| 2011/0101698 | A1 | 5/2011 | Saluccio |
| 2011/0215767 | A1 | 9/2011 | Johnson et al. |
| 2011/0248675 | A1 | 10/2011 | Shiu et al. |
| 2011/0302108 | A1 * | 12/2011 | Werner ................... B60L 53/65 |
| | | | 700/297 |
| 2012/0085082 | A1 | 4/2012 | Levijoki et al. |
| 2012/0181854 | A1 | 7/2012 | Gopalakrishnan et al. |
| 2012/0181953 | A1 | 7/2012 | Hsu et al. |
| 2012/0206296 | A1 | 8/2012 | Wan |
| 2012/0286063 | A1 | 11/2012 | Wang et al. |
| 2013/0024035 | A1 | 1/2013 | Ito et al. |
| 2013/0027048 | A1 | 1/2013 | Schwarz et al. |
| 2013/0038279 | A1 | 2/2013 | Seyerle et al. |
| 2013/0113413 | A1 | 5/2013 | Harty |
| 2013/0119935 | A1 | 5/2013 | Sufrin-Disler et al. |
| 2013/0127399 | A1 | 5/2013 | Tang et al. |
| 2014/0152232 | A1 | 6/2014 | Johnson et al. |
| 2014/0197776 | A1 | 7/2014 | Schlaupitz et al. |
| 2015/0084434 | A1 | 3/2015 | Mousavi et al. |
| 2016/0052450 | A1 | 2/2016 | Chan et al. |
| 2016/0285296 | A1 | 9/2016 | Namou et al. |
| 2017/0307390 | A1 | 10/2017 | Uyeki |
| 2019/0135125 | A1 | 5/2019 | Sponheimer et al. |
| 2019/0392367 | A1 | 12/2019 | Gara et al. |
| 2020/0353839 | A1 * | 11/2020 | Tarchinski .............. B60L 58/12 |
| 2022/0194255 | A1 * | 6/2022 | Hartnagel .............. G06Q 50/06 |
| 2022/0258642 | A1 * | 8/2022 | Salter ..................... B60L 53/14 |
| 2023/0105569 | A1 * | 4/2023 | Kostrzewski ......... B60L 53/305 |
| | | | 320/109 |

OTHER PUBLICATIONS

Wei-Yu Chiu et al. "Pareto Optimal Demand Response Based on Energy Costs and Load Factor in Smart Grid" IEEE Transactions on Industrial Informatics, vol. 16, No. 3, Mar. 2020 (Year: 2020).*

Mohammad Mousavi et al. "EV Charging Station Wholesale Market Participation: A Strategic Bidding and Pricing Approach" (2022) North American Power Symposium (NAPS) (Year: 2022).*

* cited by examiner

INTELLIGENT CHARGING SYSTEMS AND CONTROL LOGIC FOR CROWDSOURCED VEHICLE ENERGY TRANSFER

INTRODUCTION

The present disclosure relates generally to electrical systems for charging motor vehicles. More specifically, aspects of this disclosure relate to systems and methods for provisioning crowdsourced vehicle charging and vehicle grid integration operations.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, a traction battery pack, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Many commercially available hybrid-electric and full-electric vehicles employ a rechargeable traction battery pack to store and supply the requisite power for operating the powertrain's traction motor(s). To generate tractive power with sufficient vehicle range and speed, a traction battery pack is significantly larger, more powerful, and higher in capacity than a 12-volt starting, lighting, and ignition (SLI) battery. Contemporary traction battery packs, for example, group stacks of battery cells (e.g., 8-16 cells/stack) into individual battery modules (e.g., 10-40 modules/pack) that are mounted onto the vehicle chassis by a battery pack housing or support tray. Stacked electrochemical battery cells may be connected in series or parallel through use of an electrical interconnect board (ICB) or front-end DC-to-DC bus bar assembly. A dedicated Electronic Battery Control Module (EBCM), through collaborative operation with a Powertrain Control Module (PCM) and Traction Power Inverter Module (TPIM), regulates the operation of the battery pack.

As hybrid and electric vehicles become more prevalent, infrastructure is being developed and deployed to make day-to-day use of such vehicles feasible and convenient. Electric vehicle supply equipment (EVSE) comes in many forms, including residential electric vehicle charging stations (EVCS) purchased and operated by a vehicle owner (e.g., installed in the owner's garage), publicly accessible EVCS deployed by public utilities or private retailers (e.g., at independently owned or municipal charging stations), and high-voltage, high-current charging stations used by manufacturers, dealers, and service stations. Plug-in hybrid and electric vehicles, for example, can be recharged by physically connecting a charging cable of the EVCS to a complementary charging port of the vehicle. By comparison, wireless electrical charging systems utilize electromagnetic filed (EMF) induction or other wireless power transfer (WPT) technology to provide vehicle charging capabilities without the need for mating cables and cable ports.

Vehicle electrification presents an opportunity, through bidirectional charging infrastructure and strategy, to contribute to the capacity and reliability of public power grids. Intelligent vehicles may contribute through participation in vehicle grid integration (VGI) activities by modulating vehicle charging and supporting two-way reverse power flow (RPF) between the vehicle's battery system and a public utility company. Vehicles with an electrified powertrain or transporting a mobile EV charging station may also offer road-side assistance services for recharging other vehicles.

SUMMARY

Presented herein are intelligent charging systems with attendant control logic for transferring energy to and from motor vehicles, methods for operating and methods for manufacturing such systems, and electric-drive vehicles with vehicle-to-vehicle (V2V) and vehicle-to-grid (V2G) energy transfer capabilities. By way of example, there are presented computer-implemented systems and methods for enabling crowdsourced V2V and V2G power supply, storage, and integration by implementing a market-based, agent-mediated approach. An "agent" middleware node may act as an intermediator between participating customers, such as registered EVs and power utility companies, and crowdsourced service providers, such as heterogeneous EVs, road-side assistance personnel with portable EV chargers, home charging points, etc. The agent facilitates battery boosting to the EV as well as energy transfer and optional storage for the utility within a predefined geo-fenced region of interest (ROI) around the customer. A multi-stage procurement procedure may be executed for energy request intake, request for bid (RFB) broadcasting, bid intake and selection, energy transfer contracting, transfer confirmation, and post-processing for closed-loop feedback. A multi-criteria selection strategy may be used to coordinate an optimal assignment of tasks to both a customer and a service provider that maximize a joint utility function or a best trade-off Pareto solution. A customer may be enabled to manually or automatically choose a provider based on a predefined weighting scheme or customer-defined preference information. A task-bundling framework may be employed to allocate multiple boosting/transfer/storage tasks as a bundle to a single service provider. This provider may subsequently allocate these tasks to other service providers, e.g., via auction.

Attendant benefits for at least some of the disclosed concepts include crowdsourced V2V roadside energy assistance, e.g., enhancing vehicle charging and reducing range anxiety, and V2G integration, e.g., diminishing utility grid energy peaks and valleys. Customer satisfaction and experience is also improved through market-based, agent mediated crowdsourced V2V battery boosting and V2G energy storage/transfer. Other attendant benefits may include reducing the need and associated costs for large-volume, grid-based EVCS that are permanently affixed to parking infrastructure. In addition to improved charging capabilities and customer experience, disclosed concepts may help to increase driving range and pack performance for electric-drive vehicles.

Aspects of this disclosure are directed to system control logic, closed-loop feedback control techniques, and computer-readable media (CRM) for governing the transfer of energy to/from motor vehicles. In an example, a method is presented for operating an intelligent charging system for transferring energy to a user, such as a motor vehicle and/or a power utility company. This representative method includes, in any order and in any combination with any of the above and below disclosed options and features: receiving, e.g., via a system controller of the intelligent charging system from a user interface of the user, such as an in-vehicle telematics unit or a dedicated mobile software application operating on a user's smartphone, a transfer request to schedule a transfer of electricity to the user; broadcasting, e.g., via the system controller over a wireless communications network to a crowdsourced set of service providers, a solicitation for energy transfer bids for completing the user's transfer request; receiving, e.g., via the system controller from a subset of the solicited service providers, multiple bid submissions for completing the transfer request; selecting an optimized bid submission from the received bid submissions using a multi-criteria selection strategy, which includes a joint utility maximization function (weighted scalar approach) and/or a trade-off Pareto solution (optimal front approach); and transmitting, e.g., via the system controller to a selected service provider associated with the optimized bid submission, a task allocation with instructions to provide the transfer request.

Additional aspects of this disclosure are directed to intelligent charging systems for crowdsourcing the transfer of energy to/from vehicles, vehicles with V2V and V2G energy transfer capabilities, and "agent" middleware engines for provisioning market-based, agent-mediated energy transfer. As used herein, the terms "vehicle" and "motor vehicle" may be used interchangeably and synonymously to include any relevant vehicle platform, such as passenger vehicles (ICE, HEY, FEV, fuel cell, fully and partially autonomous, etc.), commercial vehicles, industrial vehicles, tracked vehicles, off-road and all-terrain vehicles (ATV), motorcycles, farm equipment, watercraft, aircraft, etc. In an example, an intelligent charging system provisions the transfer of energy from a crowdsourced fleet of registered service providers to one or more registered vehicles, utility companies, and/or other electrified users.

Continuing with the discussion of the preceding example, the intelligent charging system includes a resident or remote memory device that store registration information for assorted users and service providers, a communications device operable to communicate with the users and service providers, and a server-class computer with a controller (e.g., microcontroller, control module, or network of controllers/modules) that regulates, among other things, the transfer of electrical power between the users and service providers. The system controller is programmed to receive, e.g., from a user interface of at least one user via the communications device, a transfer request to transfer electricity to the user. In response, the system controller broadcasts a solicitation for energy transfer bids for completing the transfer request to a crowdsourced set of the service providers; multiple bid submissions are then received for completing the transfer request. From the received bid submissions, the controller selects an optimized bid submission using a multi-criteria selection strategy, such as a joint utility maximization function and/or a trade-off Pareto solution. A task allocation with instructions to provide the transfer request is transmitted to the service provider associated with the optimized bid submission.

For any of the disclosed systems, vehicles, and methods, the optimized bid submission may be selected using a joint utility maximization function, which may be calculated by maximizing a joint utility $u(t)$ as a function of completing the transfer request task t, a user-defined customer weighting factor $\omega_c$, a customer utility function $u_c(t)$ of the user, a provider-defined service provider weighting factor $\omega_s$, and a provider utility function $u_s(t)$ of the selected service provider. In this instance, the customer utility function $u_c(t)$ may be calculated as a function of an expected impact $imp_c(t)$ on an energy storage device the user, an estimated time of arrival of or an estimated time to reach $ETA(t)$ the selected service provider, a total cost $pay_c(t)$ requested in the bid submission from the selected service provider to complete task t, and user-defined weights of impact, ETA, and payment $\beta_i$, $\beta_{eta}$, and $\beta_p$, respectively. The provider utility function $u_s(t)$ may be calculated as a function of a total compensation $pay_s(t)$ paid by the user for completing the task t, a total distance $dis(t)$ the selected service provider has to travel to reach the user, an expected impact $imp_s(t)$ on an energy storage device of the selected service provider, and provider-defined weights of payment, distance, and impact $\alpha_p$, $\alpha_d$, and $\alpha_i$, respectively.

For any of the disclosed systems, vehicles, and methods, the optimized bid submission may be selected using a trade-off Pareto solution, which may include executing a bi-objective optimization technique to visualize a Pareto-front tradeoff curve as a function of objective values and objective tradeoffs. In this instance, the trade-off Pareto solution may generate multiple best trade-off proposals, which may be plotted as a graph of service provider utility function $u_s(t)$ versus customer utility function $u_c(t)$. Prior to transmitting the task allocation to the selected service provider, the system controller may present the best trade-off proposals to the user with a prompt to select one of the proposals. The system controller receives the selected best trade-offs proposal from the user and sets the optimized bid submission as the selected proposal.

For any of the disclosed systems, vehicles, and methods, the user may be a single user or a combination of multiple heterogeneous users. In the latter instance, the system controller may receive, process, and facilitate multiple transfer requests from multiple users. Moreover, a service provider's bid submission may include a request to bundle multiple select ones of the received transfer requests. After selecting the optimized bid submission, the system controller may generate a task agreement to complete the user's transfer request by the selected service provider. The task agreement is then transmitted to one or both parties with a prompt to approve the task agreement.

For any of the disclosed systems, vehicles, and methods, the system controller may receive geolocation data indicative of the user's real-time location prior to soliciting energy transfer bids. A geo fence of a predefined size is then defined around the user's real-time location. The system controller then receives geopositional data indicative of the real-time locations of multiple registered service providers. A crowdsourced set of service providers may be derived as a subset of the registered service providers within the geo fence. As yet a further option, the system controller may retrieve, e.g., from a resident or remote memory device, a priori data for the user and the service providers associated with the received bid submissions. The controller may then execute a tree data structure to locate predefined keys within the received a priori data; selecting the optimized bid submission may be further based on the predefined keys located within the received a priori data using the tree data structure.

For any of the disclosed systems, vehicles, and methods, the system controller may receive a transfer confirmation verifying that the transfer request was provided to the user by the selected service provider. After transmitting the task allocation and thereafter receiving the transfer confirmation, the system controller may prompt the user and/or the selected service provider to evaluate the provisioning of the transfer request. As yet a further option, the system controller may receive, process, and store a respective registration data file for each user and each service provider.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features described above and below.

Figure 1:
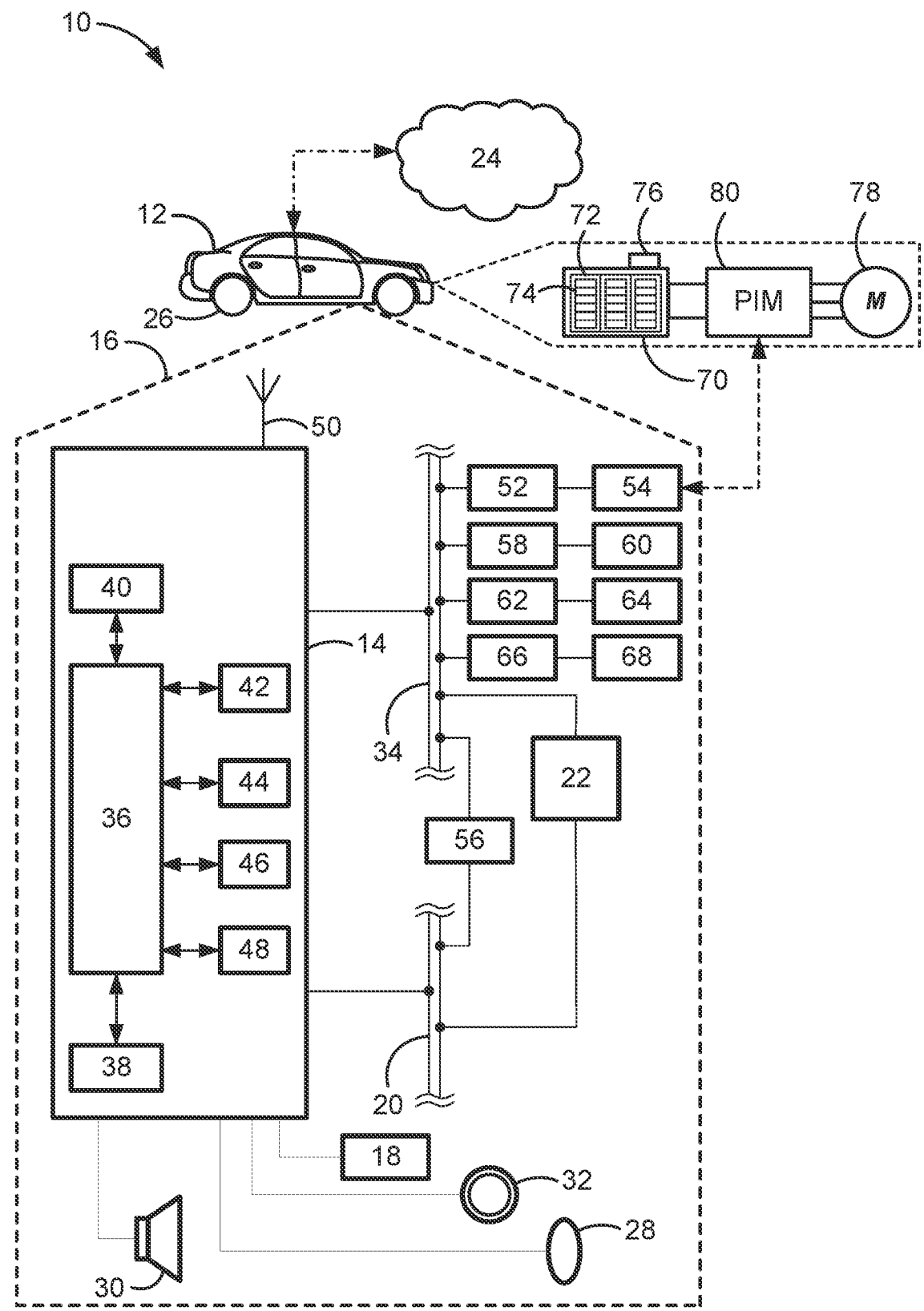
FIG. 1 is a partially schematic, side-view illustration of a representative motor vehicle with an electrified powertrain and a network of in-vehicle controllers, sensing devices, input/output devices, and communication devices for intelligent V2V and V2G energy storage and transfer according to aspects of the disclosed concepts.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a representative automobile, which is designated generally at 10 and portrayed herein for purposes of discussion as a sedan-style, electric-drive passenger vehicle. The illustrated automobile 10—also referred to herein as "motor vehicle" or "vehicle" for short—is merely an exemplary application with which aspects of this disclosure may be practiced. In the same vein, utilization of the present concepts for an all-electric vehicle powertrain should also be appreciated as a non-limiting implementation of disclosed features. As such, it will be understood that aspects and features of this disclosure may be applied to other powertrain architectures, may be implemented for any logically relevant type of vehicle, and may be utilized for transferring energy between any combination of users and service providers. Moreover, only select components of the motor vehicles and charging systems are shown and described in additional detail herein. Nevertheless, the vehicles and systems discussed below may include numerous additional and alternative features, and other available peripheral components, for carrying out the various methods and functions of this disclosure.

The representative vehicle 10 of FIG. 1 is originally equipped with a vehicle telecommunication and information ("telematics") unit 14 that wirelessly communicates, e.g., via cell towers, base stations, mobile switching centers, satellite service, etc., with a remotely located or "off-board" cloud computing host service 24 (e.g., ONSTAR®). Some of the other vehicle hardware components 16 shown generally in FIG. 1 include, as non-limiting examples, a touchscreen video display device 18, a microphone 28, audio speakers 30, and assorted input controls 32 (e.g., buttons, knobs, pedals, switches, touchpads, joysticks, touchscreens, etc.). These hardware components 16 function, in part, as a human/machine interface (HMI) to enable a user to communicate with the telematics unit 14 and other system components within and external to the vehicle 10. Microphone 28 provides a vehicle occupant with means to input verbal or other auditory commands; the vehicle 10 may be equipped with an embedded voice-processing unit utilizing audio filtering, editing, and analysis modules. Conversely, the speaker(s) 30 provide audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switch, parallel/serial communications bus, local area network (LAN) interface, controller area network (CAN) interface, media-oriented system transfer (MOST) interface, local interconnection network (LIN) interface, and the like. Other appropriate communication interfaces may include those that conform with ISO, SAE, and/or IEEE standards and specifications. The network connection interface 34 enables the vehicle hardware 16 to send and receive signals with one another and with various systems and subsystems both within or "resident" to the vehicle body 12 and outside or "remote" from the vehicle body 12. This may allow the vehicle 10 to perform various vehicle functions, such as modulating powertrain output, governing operation of the vehicle's transmission, selectively engaging the friction and regenerative brake systems, controlling vehicle steering, regulating charge and discharge of the vehicle's battery modules, and other automated functions. For instance, telematics unit 14 may receive and transmit signals and data to/from a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle modules, such as a transmission control module (TCM), engine control module (ECM), Sensor System Interface Module (SSIM), navigation system control (NSC) module, etc.

With continuing reference to FIG. 1, telematics unit 14 is an onboard computing device that provides a mixture of services, both individually and through its communication with other networked devices. This telematics unit 14 is generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, flash memory, semiconductor memory (e.g., various types of RAM or ROM), etc.

Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range wireless communication device 46 (e.g., a BLUETOOTH® unit or near field communications (NFC) transceiver), a dedicated short-range communications (DSRC) component 48, and/or a dual antenna 50. If desired, vehicle 10 may be implemented without one or more of the components depicted in FIG. 1 or, optionally, may include additional components and functionality as desired for a particular end use. The various communication devices described above may be configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Grid (V2G), etc.

CPU 36 receives sensor data from one or more sensing devices that use, for example, photo detection, radar, laser, ultrasonic, optical, infrared, or other suitable technology for executing an automated driving operation, including short range communications technologies such as DSRC or Ultra-Wide Band (UWB). In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion and analysis hardware and software for processing raw sensor data. The type, placement, number, and interoperability of the distributed array of in-vehicle sensors may be adapted, singly or collectively, to a given vehicle platform for achieving a desired level of autonomous vehicle operation. Using data from the sensing devices 62, 64, 66, 68, the CPU 36 may identify surrounding driving conditions, determine roadway characteristics and surface conditions, identify target objects within a detectable range of the vehicle, and perform automated control maneuvers based on these executed operations.

To propel the electric-drive vehicle 10, an electrified powertrain is operable to generate and deliver tractive torque to one or more of the vehicle's road wheels 26. The powertrain is generally represented in FIG. 1 by a rechargeable energy storage system (RESS), which may be in the nature of a chassis-mounted traction battery pack 70, that is operatively connected to an electric traction motor 78. The traction battery pack 70 is generally composed of one or more battery modules 72 each having a stack of battery cells 74, such as lithium ion, lithium polymer, or nickel metal hydride battery cells of the pouch, can, or prismatic type. One or more electric machines, such as traction motor/generator (M) units 78, draw electrical power from and, optionally, deliver electrical power to the RESS's battery pack 70. A dedicated power inverter module (PIM) 80 electrically connects the battery pack 70 to the motor/generator (M) unit(s) 78 and modulates that transmission of electrical current therebetween.

The battery pack 70 may be configured such that module management, including cell sensing, thermal management, and module-to-host communications functionality, is integrated directly into each battery module 72 and performed wirelessly via a wireless-enabled cell monitoring unit (CMU) 76. The CMU 76 may be a microcontroller-based, printed circuit board (PCB)-mounted sensor array. Each CMU 76 may have a GPS transceiver and RF capabilities and may be packaged on or in a battery module housing. The battery module cells 74, CMU 76, housing, coolant lines, busbars, etc., collectively define the module assembly.

Electric traction motor 78 may be in the nature of an electromechanical motor/generator unit (MGU) that acts as a source of tractive propulsion for propelling the vehicle 10 and as an electrical generator for producing electric power that is stored in traction battery pack 70. For instance, an MGU may operate to generate motor torque that is input to a power transmission independently of engine torque that is output from an internal combustion engine assembly. For HEV powertrain configurations, the MGU may also function as a starter motor for cranking the engine and to boost engine output by supplementing engine torque. During a regenerative braking operation, the MGU may operate as a generator that transforms the vehicle's kinetic energy into electrical energy that can be transferred to the in-vehicle RESS. For a P0 or P1 hybrid powertrain, the MGU may operate as a high-voltage (HV) integrated starter generator (ISG) that converts engine torque to electrical energy that can be stored locally or transferred to an off-board load.

During vehicle operation, a driver or other occupant of the vehicle 10 may wish to identify available energy sources for recharging the traction battery pack 70, e.g., to extend the driving range of the vehicle 10 beyond a maximum range provided by a present charge of the battery pack 70. Alternatively, a driver or occupant may wish to operate the vehicle 10 as an energy source that is made available for recharging another vehicle's EVB or delivering energy to a public utility or a residential power supply. According to aspects of the present disclosure, a market-based, agent-mediated integration system and method provisions crowdsourced V2V battery boosting and V2G integration for energy transfer and storage. A multi-criteria winning determination strategy may be employed to find an optimal assignment of tasks for both a registered user (customer) and a service provider (energy source). The winning determination strategy may maximize a joint utility function or a best trade-off Pareto solution and, if desired, allow a customer to manually or automatically choose a strategy based on a predefined weighting scheme or preference information set by the customer. An optional task bundling framework may enable the allocating of multiple tasks as a bundle to a single service provider. This service provider may then "play the role of auctioneer" to triage these tasks to other service providers.

A task identification and allocation (TIA) module enables energy transfer from a crowdsourced service provider to a registered user using a six-stage process. During an Announcement Stage, an agent computing node may take up the role of coordinator that processes incoming power transfer requests and broadcasts the associated tasks to a crowd of service providers as available for bidding. After calculating individual utility values based on objective functions, individual service providers communicate their respective bids with their requested value to the coordinating agent during a Submission Stage. After intake and processing of the bids, a Selection Stage is carried out to evaluate the received bids based on joint utility functions or Pareto solutions. Upon selection of a winning bid, a contract is created and disseminated to execute the task by the corresponding service provider as part of a Contract Stage. During an Execution Stage, the energy transfer task is completed by the service provider and confirmed by the user. For a Post-Execution Stage, auto-payment is enabled once the task is fulfilled and verified by the customer. Two-way rating of the user and the service provider may also be performed; the rating may be taken into consideration in the winning determination strategy of a future task allocation.

Figure 2:
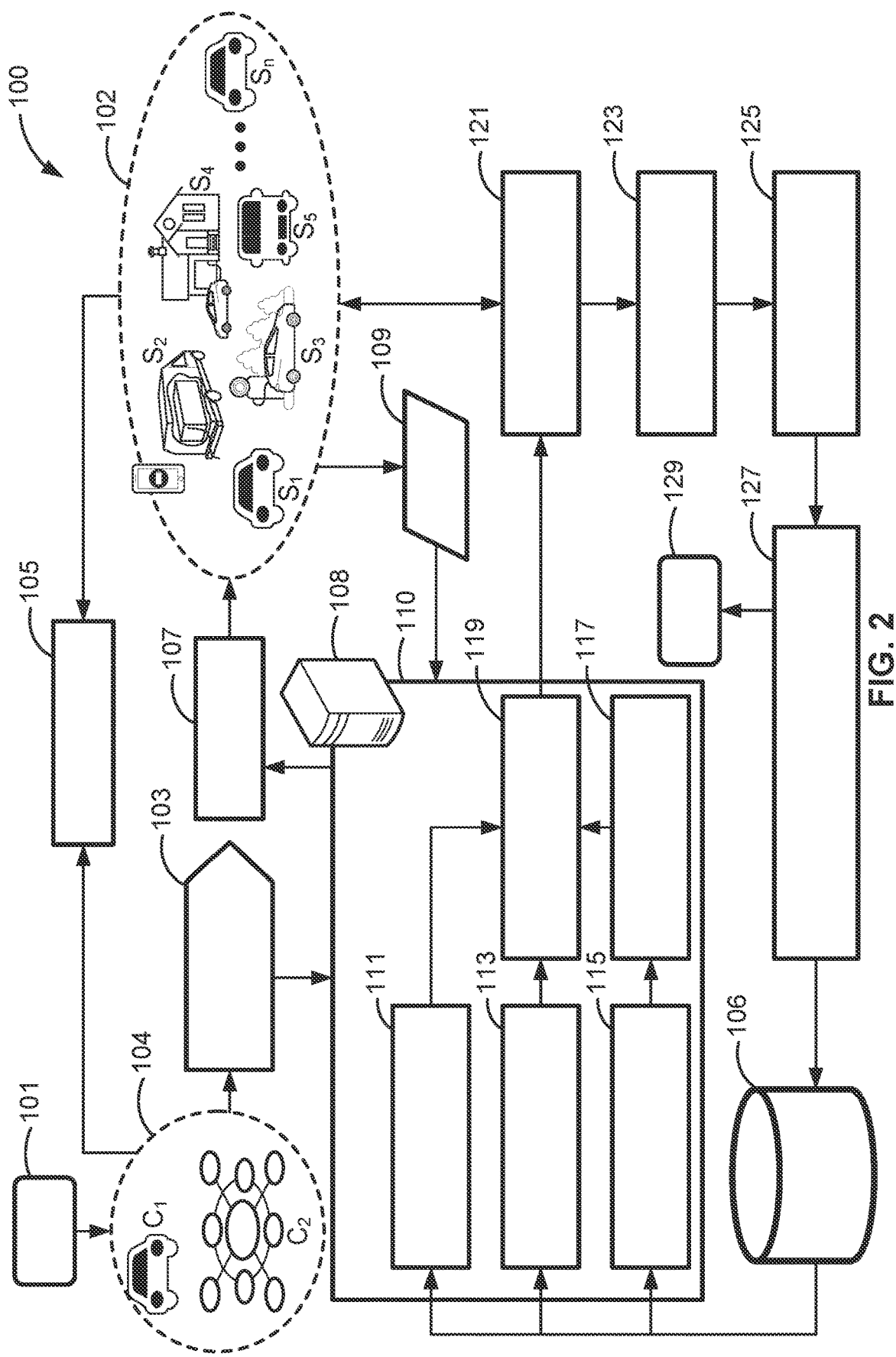
FIG. 2 is a diagram illustrating a representative vehicle charging system and control protocol for transferring energy from one or more crowdsourced service providers to one or more registered users, including processes which may correspond to memory-stored instructions that are executable by a resident or remote controller, control-logic circuit, programmable control unit, or other integrated circuit (IC) device or network of devices in accord with aspects of the disclosed concepts.

With reference next to the flowchart of FIG. 2, there is shown an intelligent charging system and attendant control logic, collectively designated at 100, for transferring energy from one or more crowdsourced service providers 102 to one or more registered users 104 in accordance with aspects of the present disclosure. Some or all of the operations illustrated in FIG. 2, and described in further detail below, may be representative of an algorithm that corresponds to processor-executable instructions that are stored, for example, in main or auxiliary or remote memory (e.g., host service 24 cloud-based storage of FIG. 1 or database 106 storage of FIG. 2), and executed, for example, by an electronic controller, processing unit, logic circuit, or other module or device or network of modules/devices (e.g., host service 24 cloud computing of FIG. 1 or server-class computer 108 management of FIG. 2), to perform any or all of the above and below described functions associated with the disclosed concepts. The order of execution of the operations illustrated in FIGS. 2-5 may be changed, additional operation blocks may be added, and some of the described operations may be modified, combined, or eliminated. For instance, the following pairs denote control actions/operations within the Figures that may be similar or the same: 110 and 211; 107 and 203; 103 and 201; 123 and 215; 125 and 217; and 121 and 213.

Method 100 of FIG. 2 begins at START terminal block 101 with memory-stored, processor-executable instructions for a programmable controller or control module or similarly suitable processor to call up an initialization procedure for scheduling an energy transfer event for a user, such as electric-drive vehicle C1 or "smart grid" utility company C2. System evaluation for provisioning this routine may be executed in real-time, near real-time, continuously, systematically, sporadically, and/or at regular intervals, for example, each 10 or 100 milliseconds during normal and ongoing operation of the motor vehicle 10. As yet another option, terminal block 101 may initialize responsive to a user command prompt, a resident vehicle controller prompt, or a broadcast prompt signal received from an "off-board" centralized vehicle services system (e.g., host cloud computing service 24). Telematics unit 14 in electric-drive vehicle 10 of FIG. 1, for example, may display a notification that the traction battery pack 70 has or is expected to have a low state of charge; the driver may respond by pressing a soft button to schedule a recharge event. Upon completion of the control operations presented in FIG. 2, the method 100 may advance to END terminal block 129 and temporarily terminate or, optionally, may loop back to terminal block 101 and run in a continuous loop.

Upon submission of a request to schedule an energy transfer event, an HMI or other suitable input/output device of a user may issue a call for charge/transfer, as indicated at CHARGE REQUEST transmission block 103. The charge request may include details about the user, the requested task, and other potentially pertinent information, such as user location, behavioral, and ratings data. While FIG. 2 portrays two representative customers C1 and C2 within a user group 104, it should be appreciated that any number and type of users that utilize electrical power may register with the intelligent charging system 100. In this regard, there are six representative service providers shown in FIG. 2 within a crowdsourced group of available service providers 102: a full-electric vehicle S1, a portable charger transported by a cargo van S2, a workplace/public charging point S3, a residential EVCS S4, an electric bus S5, and . . . a hybrid-electric vehicle Sn. Nevertheless, it should be appreciated that the crowdsourced group of available service providers 102 may be composed of any number and type of providers that are able to store, transport and transfer electrical power.

Prior to, contemporaneous with, or after transmitting a call for charge/transfer, each party who wishes to operate as a service provider 102 and each party who wishes to participate as a user 104 may be directed to register with the intelligent charging system 100 as part of REGISTRATION process block 105. An individual may register as a service provider by completing a provider profile, which may necessitate submitting personal information, payee processing information, and expected location or locations of operation. A prospective service provider may also be asked to identify their qualifications and the types of services they intend to offer. Likewise, a potential user may register with the system 100 by completing a user profile, which may also necessitate submitting personal information, providing payor processing information, and indicating which types of services they expect to use. User and provider registration may be completed online via a web portal accessed through a personal computing device, via a dedicated mobile software application operating on a personal smartphone, or through a touchscreen display and/or input controls of in-vehicle HMI, as some non-limiting examples.

After receiving the request for charge/transfer, a networked system controller of a server-class computer 108 within the intelligent charging system 100 broadcasts an announcement to the crowdsourced set of service providers 102 with a solicitation for bids to complete the user's energy transfer request, as indicated at ANNOUNCEMENT output process block 107. Prior to broadcasting the bid submission request, the intelligent charging system 100 may first filter potential service providers based, for example, on a nature of the service request, a location of the user, respective locations of available service providers, and other relevant criterion. By way of non-limiting example, the server-class computer 108 may collect geolocation data that specifies the user's real-time, near real-time, or expected location of energy transfer. Using this information, a virtual geo fence of a predefined size may be assigned to or dynamically built around the user's location. Geopositional data that specifies respective real-time, near real-time, or estimated locations of available service providers is concurrently collected; the crowdsourced set of service providers from which bids are solicited may be defined as a subset of registered service providers within the user-specific geo fence. At BIDS input process block 109, the charging system's server-class computer 108 thereafter receives a single bid submission or multiple bid submissions for completing the energy transfer request from one or more of the crowdsourced service providers 102.

Intelligent charging system and method 100 of FIG. 2 responds to the bid submissions received through input process block 109 by automating a MARKET-BASED TASK ALLOCATION MODULE 110. Market-based task allocation may generally function to allocate a set of tasks—battery boosting, energy storage, energy transfer, etc.—requested by a set of customers to a set of service providers following an auctioning or trading process. At JOINT UTILITY FUNCTION process block 111, the system 100 executes a joint utility function as an objective function to be maximized from the perspectives of both the user and the service provider. In general, a customer's set of objectives may conflict with a service provider's set of objectives; the joint utility function attempts to reconcile these inherent differences with a best tradeoff protocol because there is potentially no universal best solution that maximize both the customer's objectives and the service provider's objectives. Examples of multi-objective optimization processes for selecting a "winning" bid are described in further detail below with respect to FIG. 5.

As part of the market-based task allocation process, the server-class computer 108 may retrieve non-empirical a priori data for the requesting user and the bidding service providers from database 106. Such a priori data may contain prior ratings data, prior transaction details, prior request/bid details, etc., specific to a designated user or a designated service provider. At SEARCH TREE process block 115, a tree data structure may be executed to locate predefined keys within the received a priori data, e.g., in scenarios in which a complex task is present. In the tree structure, for example, complex tasks (parents) may be decomposed into simple tasks (children); graph search algorithms may then be applied to determine a sequence of task execution for the simplified children tasks. For a white-box mathematical model with sufficient a priori data, these keys may facilitate the joint utility function analysis carried out at process block 111 and when evaluating the stipulations set forth in each of the received bids at BIDDING LANGUAGE process block 113.

Advancing from process block 115, the method 100 carries out a SEARCH STRATEGY process block 117 to conduct a predefined search algorithm for traversing from the tree root through different depth levels of the tree data structure to identify specific information (e.g., a tree node that satisfies a given characteristic). There are several search strategies and algorithms that may be applied for process block 117, such as blind graph search techniques (e.g., depth-first search (DFS), breadth-first search (BFS), Dijkstra search, etc.), informed search graphs (e.g., Hill climbing, A-star, bi-directional A*, etc.), metaheuristics search techniques (e.g., genetic algorithms, swarm intelligence searches, etc.). Upon completion of the search strategy, a WINNER DETERMINATION STRATEGY process block 119 is performed to identify an optimized or "best" bid submitted by the service providers according to the best tradeoff value of the joint utility function u(t).

After selecting the winning bid, a TASK ASSIGNMENT input/output block 121 transmits a task allocation with instructions for providing the user's transfer request to the selected service provider associated with the selected bid submission. The selected service provider may respond with a confirmation and an estimated time of arrival; the user may be concomitantly informed of the confirmation and ETA. Continuing to CHARGING/ENERGY TRANSFER process block 123, the user-requested task is completed by the service provider; confirmation of completion may be sent to the system server computer 108 by the user and/or service provider. Once the requested energy transfer task is complete, the user as payor submits payment to the service provider as payee (either directly or through the agent middleware node), as indicated at PAYMENT process block 125. The registered user and selected service provider are then prompted to rate each other's performance in completing the task at 2-WAY RATING input/output block 127. The method 100 may thereafter advance to END terminal block 129 and temporarily terminate.

Figure 3:
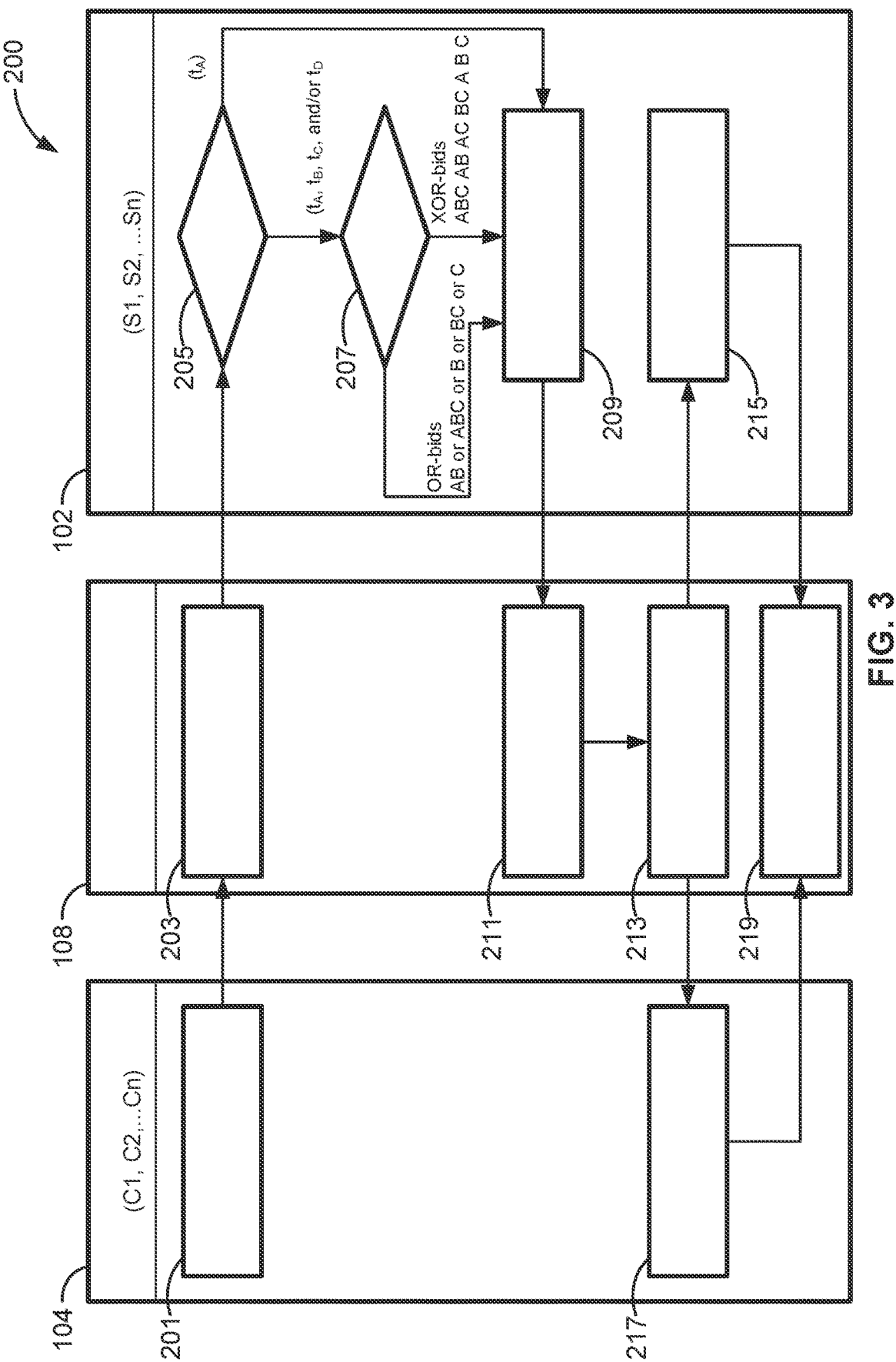
FIG. 3 is a flowchart illustrating a representative bidding language protocol with a middleware application arbitrating the transfer of energy between users and service providers, which may correspond to memory-stored instructions that are executable by a resident or remote controller, control-logic circuit, programmable control unit, or other IC device or network of devices in accord with aspects of the disclosed concepts.

FIG. 3 illustrates a representative bidding language method 200 for a middleware application to arbitrate a transfer of energy between a user and a service provider. In this particular example, one or more of the customers C1, C2, . . . Cn from a group of registered users 104 issues a solicitation for a transfer of energy at process block 201. For instance, four registered users may each submit a request for battery boosting/energy transfer; these four transfer requests may be translated into tasks $t_A$, $t_B$, $t_C$, and $t_D$. The need for charge/energy transfer is communicated to an agent-mediated middleware application, such as server-class computer 108 of FIG. 2, for intake and processing. A corresponding announcement is generated and broadcast to one or more of the service providers S1, S2, . . . Sn in a crowdsourced group of service providers 102 at process block 203.

Upon receipt of the announcement of the request for energy transfer, a service provider S1, S2, . . . Sn may be queried if they are interested in completing a single task or multiple tasks at decision block 205. In accord with the illustrated example, a service provider S1 may choose to undertake a single task $t_A$, and proceed to process block 209, or to undertake a bundle of tasks $t_A$, $t_B$, $t_C$, and/or $t_D$, and proceed to decision block 207. Upon choosing to bundle one or more of the submitted tasks $t_A$, $t_B$, $t_C$, and $t_D$, the service provider is queried for the language that will define the manner in which these tasks are bundled and performed at decision block 207. Non-limiting examples of the types of language that may be used include an OR-bid (AB OR ABC OR B OR BC OR C) and an XOR-bid (ABC AB AC BC A B C). This language is converted into a bid submission at process block 209; the bid is thereafter transmitted to the agent-mediated middleware application.

Upon receipt of all service provider bids or after expiry of a predetermined window of time in which bids will be accepted, the agent-mediated middleware application executes process block 211 and selects an optimized bid submission from the received bid submissions using a multi-criteria selection strategy, including a joint utility maximization function and/or a trade-off Pareto solution. A task agreement is then created at process block 213 to engage the selected service provider to complete the single task or the bundle of tasks identified at decision block 205. Method 200 advances to process block 215 whereat the selected service provider either completes the task/task bundle or reallocates the task or one or more of the tasks in the bundle. After enabling and executing battery boosting, energy transfer, or energy storage, the recipient user submits payment at process block 217. The registered user may then rate the selected service provider and, optionally, the selected service provider may rate the registered user at process block 219.

Figure 4:
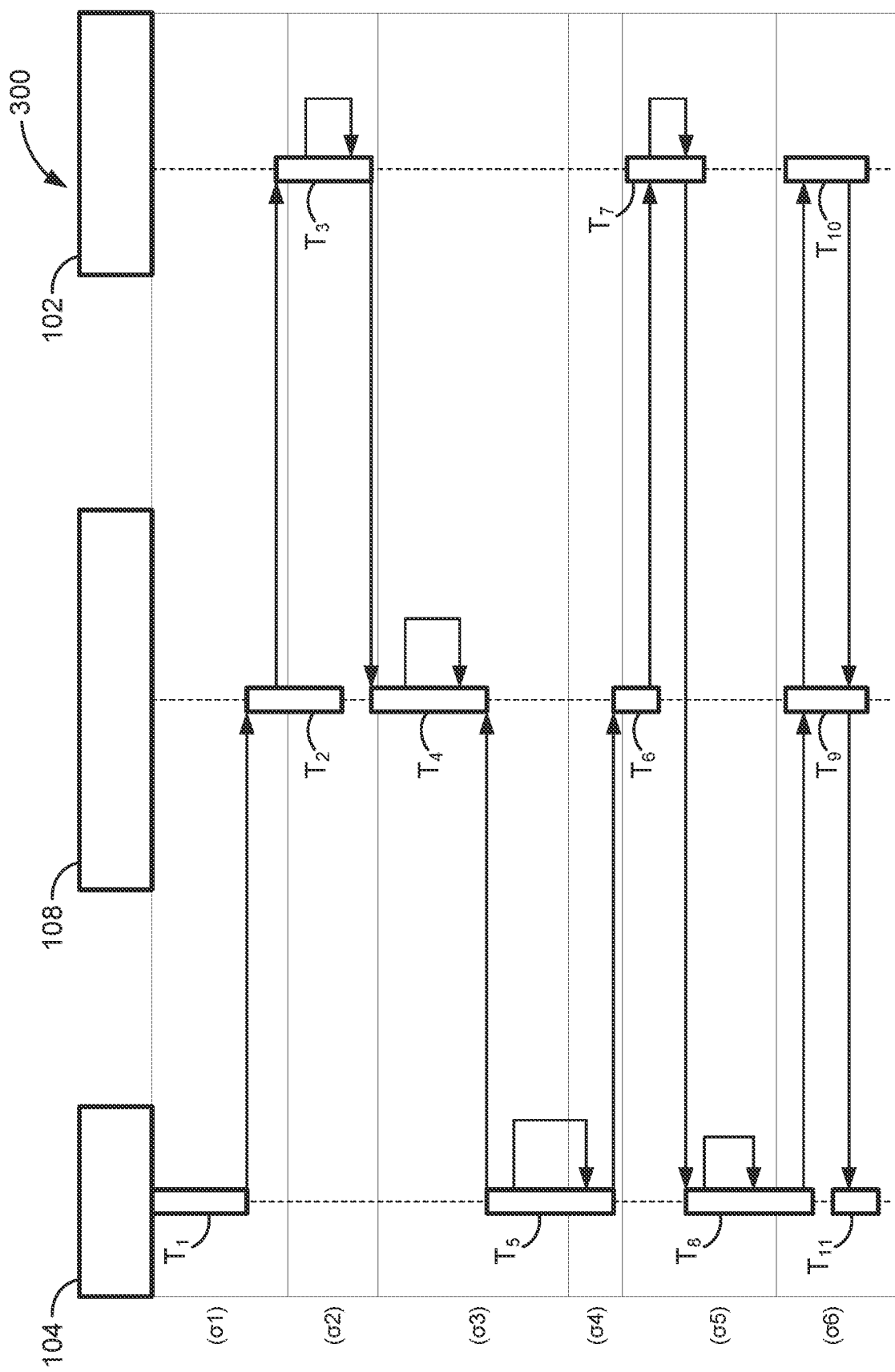
FIG. 4 is a workflow diagram illustrating a representative sequence of data exchanges between wirelessly interconnected nodes for transferring energy to/from a motor vehicle, which may correspond to memory-stored instructions that are executable by a resident or remote controller, control-logic circuit, programmable control unit, or other IC device or network of devices in accord with aspects of the disclosed concepts.

FIG. 4 illustrates a representative task identification and allocation module 300 that enables energy transfer from a crowdsourced service provider to a registered user using a six-stage vetting process: (1) an Announcement Stage σ1; (2) a Submission Stage σ2; (3) a Selection Stage σ3; (4) a Contract Stage σ4; (5) an Execution Stage σ5; and (6) a Post-Execution Stage σ6. At a first time $T_1$ during the Announcement Stage σ1, a user 104 acting as a prospective customer issues a call for charge/energy transfer. At a second time $T_2$ during the Announcement Stage σ1, a system controller 108 acting as a market-based, agent-mediated application issues an announcement of the energy transfer call to all registered and available service providers within a geo-fenced area.

At a third time $T_3$ during the Submission Stage σ2, interested service providers prepare bids to perform the call for charge/energy transfer; these bids are submitted to the agent-mediated application. Upon completion of the Submission Stage σ2, a winner is determined by the agent-mediated application at a fourth time $T_4$ during the Selection Stage σ3. The selected winner or a set of best trade-off proposals with potential winners available for selection is then transmitted from the agent-mediated application to the user 104. At a fifth time $T_5$ within the Selection Stage σ3, the selected winner is approved by the user or a winner is manually selected by the user from the set of best trade-off proposals. The approved/selected winner bid is transmitted by the user to the agent-mediated application.

Upon receipt of the approved/selected bid, the agent-mediated application generates a task agreement at a sixth time $T_6$ during the Contract Stage σ4. The task is then allocated to the selected service provider concurrent with a request to accept the task agreement. At a seventh time $T_7$ during the Execution Stage σ5, the selected service provider accepts the allocated task. The selected service provider travels to the requesting user or the user travels to the service provider to execute the battery boosting/energy transfer task; the energy transfer is thereafter completed at an eighth time $T_8$ during the Execution Stage σ5.

For the Post-Execution Stage σ6, the user transmits confirmation that the task has been completed, submits remuneration for the services provided, and rates the service provider at a ninth time $T_9$. The agent-mediated application informs the selected service provider that payment has been received and prompts the service provider to provide feedback. At a tenth time $T_{10}$ during the Post-Execution Stage σ6, the selected service provider rates the user; the ratings data is transmitted to the agent-mediated application. At the completion of the Post-Execution Stage σ6 and the TIA module of FIG. 4, the agent-mediated application informs the user that the transaction has been completed.

Figure 5:
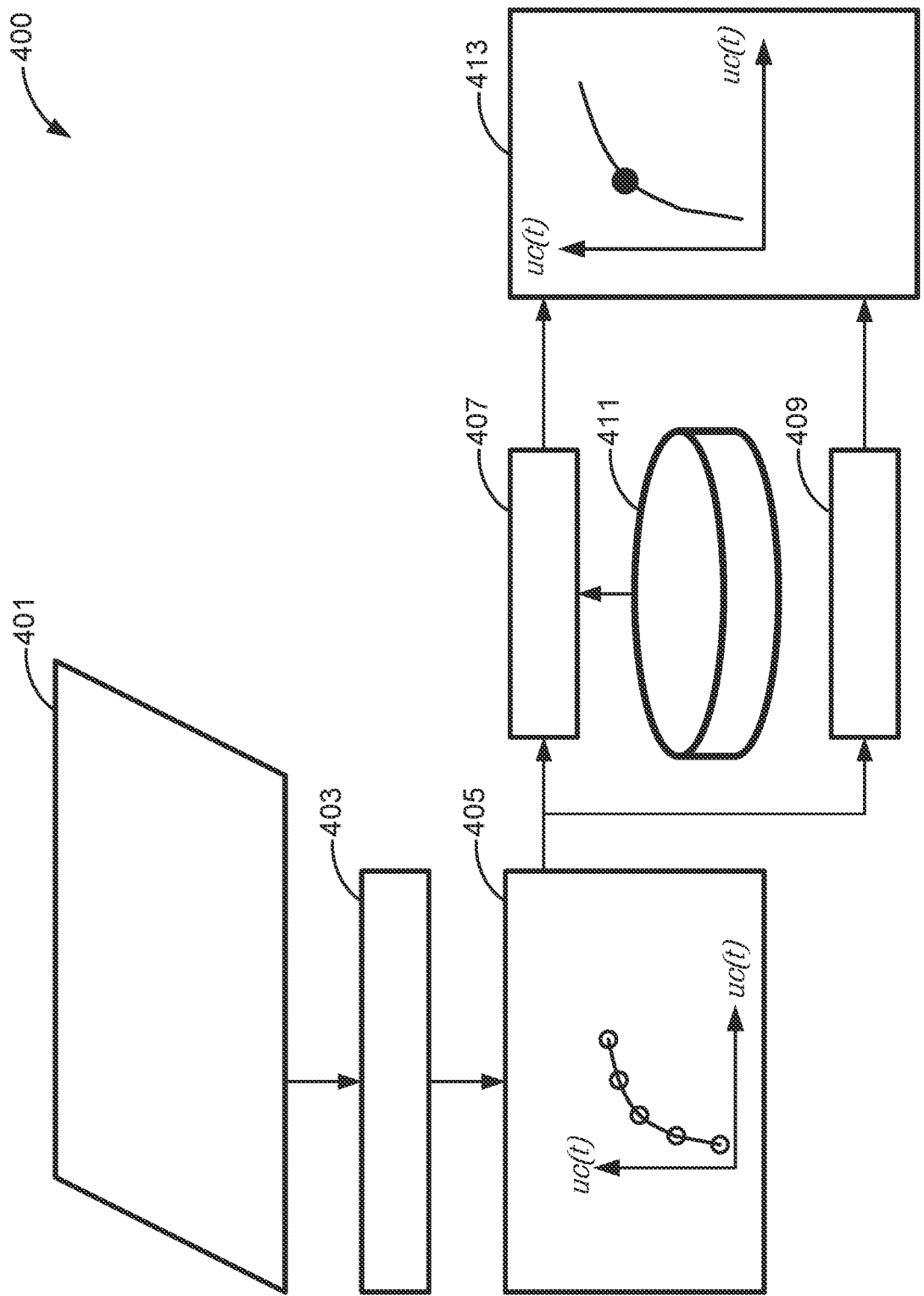
FIG. 5 is a flowchart illustrating a representative multi-objective optimization protocol for selecting an optimal bid for transferring energy to and from motor vehicles, which may correspond to memory-stored instructions that are executable by a resident or remote controller, control-logic circuit, programmable control unit, or other IC device or network of devices in accord with aspects of the disclosed concepts.

Turning next to FIG. 5, there is shown a representative multi-objective optimization method 400 for selecting an optimal bid from an assortment of bid submissions for transferring energy from a service provider to a requesting user. In a first step of method 400, process blocks 401, 403 and 405 of FIG. 5 may be representative of a Multi-Objective Optimization Problem, e.g., for concurrently mathematically optimizing multiple discrete objective functions within a feasible set of decision vectors. It may be said that, for a "nontrivial" multi-objective optimization problem, a single solution likely does not exist for simultaneously optimizing every objective in the set. In a second step of method 400, process blocks 407, 409 and 411 may be representative of a Decision Process for manually or automatically selecting a final solution based on a predefined weighting scheme or predefined preference information. Automated selection may be conducted by a resident vehicle controller, an agent-mediated middleware node, or a dedicated mobile software application, e.g., as constrained by the user-defined weighting and preferences.

For at least some implementations, the optimization method 400 attempts to simultaneously maximize (rather than minimize) the utilities for both the requesting user and the selected service provider $u_c(t)$ and $u_s(t)$, respectively, within a predefined set of hard constraints and a predefined set of soft constraints, as indicated at MULTI-OBJECTIVE OPTIMIZATION PROBLEM input/output block 401. Non-limiting examples of hard constraints may include completing all of the announced tasks, whereas non-limiting example of soft constraints may include completing a particular task within a specific time window. Advancing to MULTI-OBJECTIVE OPTIMIZER process block 403, the method 400 executes an optimization algorithm or solver that is designed to solve the multi-objective optimization problem of block 401 to find a best tradeoff or a set of Pareto values. The results of the solver in process block 403 is output at MULTIPLE TRADE-OFF SOLUTIONS process block 405; this output may contain a single solution or multiple solutions as every scenario may not have a single, universal best solution.

For the Decision Process portion of the multi-objective optimization method 400, a final solution may be automatically selected at process block 407 or manually selected at process block 409. AUTO SELECTION process block 407 may include receiving preference data and a weighting scheme data from a database block 411. As noted above, selection of a final solution may be automated by a designated electronic controller or computing device with such selection constrained by a set of predefined preferences and/or a set of predefined weighting parameters. At DECISION output data block 413, a final manually/auto-selected solution is output, e.g., for block 119 of FIG. 2, block 211 of FIG. 3, and/or time $T_5$.

With collective reference to both FIGS. 2 and 5, the problem formulation may begin with defining a customer set C={EV, Grid} with a number of customers who request battery boosting/energy transfer $c_i$ where i=1, 2, . . . , n. As noted above, each requesting user (customer) may take on any suitable consumer of electrical power, including an EV in need of battery boosting or a power utility/grid in a need for energy transfer. The problem formulation may also define a task set T of battery boosting or energy transfer tasks $t_k$, where k=1, 2, . . . , n requested by the users/customers C. Energy transfer may take the form of transferring electrical energy from the service providers to the grid or EV, storing the energy of the grid in the service provider storage for later transfer, or transferring energy from one user to another user. A provider set S={MSP, SSP} may also be defined with a number of available service providers $s_j$, where j=1, 2, . . . , m. Service provides may include any suitable mobile service provider (MSP), such as other EVs and roadside assistance professional with portable chargers in trucks, as well as suitable stationary service providers (SSP), such as home EV charging stations or publicly accessible energy storage points, within a certain geo-fenced area of interest around the customer c.

A utility set U of joint utilities $u_k$ to execute task k is also defined. For a single V2V battery boosting/V2G energy transfer task, the problem may include finding an optimal allocation of service providers to tasks, which will be a set of service provider and task pairs. For multiple V2V battery boosting/V2G energy transfer tasks, the sets can be extended to include the ability to bundle battery boosting tasks where a single service provider can complete at least a subset of available tasks $G \subseteq T$ with a total cost:

$$(s_1; t_1); (s_2; t_2); \ldots (s_k; t_k) \text{ for } 1 \le k \le n$$

$$b_s(G) = \sum_{k=1}^{f} b_s(t_k), \{t_k \subseteq T\}$$

and f is the number of tasks in the bundle

For a task allocation problem of a Joint Utility Function, utility u may be a satisfaction derived by both a customer c and a service provider s from accomplishing a battery boosting/energy transfer task t. For some implementations, a main goal may include finding an optimal or "best" assignment of the task t to both a customer c and a service providers in order to maximize utility.

For the service provider utility function, given a service provider s and a battery boosting/energy transfer task t, if s can execute t, utility can be defined on some standardized scale as:

$$u_s(t) = \begin{cases} \alpha_p pay_s(t) - \alpha_d dis(t) - \alpha_i imp_s(t) & \text{if } s \in MSP \\ pay_s(t) & \text{if } s \in SSP \end{cases}$$

where $pay_s(t)$ is a total payment a service provider will receive after executing a task t; $dis(t)$ is a total distance a mobile service provider will travel to reach a customer; $imp_s(t)$ is an expected impact on a service provider's battery/storage device or the expected decrease in the service provider's driving range due to executing the task t; and $\alpha_p$, $\alpha_d$, $\alpha_i$ are weights of payment, distance, and impact, respectively, from a service provider's perspective. Without a loss of generality, this may be normalized as $\alpha_p + \alpha_d + \alpha_i = 1$.

For the customer utility function, given a customer c who calls for a battery boosting/energy transfer task t, if c receives a bid from a service provider s, utility can be defined on some standardized scale as:

$$u_c(t) = \begin{cases} \beta_i imp_c(t) - \beta_{eta} ETA(t) - \beta_p pay_c(t) & \text{if } c \in EV \\ \beta_i imp_c(t) - \beta_p pay_c(t) & \text{if } c \in Gird \end{cases}$$

where $imp_c(t)$ is an expected impact on a customer's battery or an expected increase in the driving customer's range due to boosting; $ETA(t)$ is an estimated time of arrival of a MSP or an estimated time for a customer to reach an SSP; $pay_c(t)$ is a total payment a service provider is asking to execute a task t; and $\beta_i$, $\beta_{eta}$, $\beta_p$ are weights of impact, ETA, and payment, respectively, from a customer's perspective. Without a loss of generality, this may be normalized such $\beta_i + \beta_{eta} + \beta_t = 1$ if s is an EV and $\beta_i + \beta_p = 1$ ifs is a Grid.

A winner determination strategy may include performing a Pareto Optimality analysis. For instance, the optimized bid submission is selected using a trade-off Pareto solution that includes execution of a bi-objective optimization technique to visualize a Pareto-front tradeoff curve as a function of objective values and objective tradeoffs. The trade-off Pareto solution may generate multiple best trade-off proposals; these best trade-off proposals may be presented to the user with a prompt to select an available proposal The agent-mediated middleware node may receive the user's selected best trade-offs proposal and set the optimized bid submission as the selected proposal. As yet a further option, a winner determination strategy may utilize a scalar approach including:

$$\text{maximize } u(t) = \omega_c \cdot u_c(t) + \omega_s \cdot u_s(t)$$

subject to t ∈ T, where $\omega_i$ are weights and, without a loss of generality, may be normalized such that $\Sigma\omega_i=1$.

Discussed above are market-based, agent-mediated integration frameworks for crowdsourced, geo-fenced V2V battery boosting and V2G energy transfer from mobile and stationary service providers. Also discussed are combinatorial auctioning protocols with a six-stage process—Announcement, Submission, Selection, Contract, Execution, and Post-Execution Stages—for simple and complex battery boosting/energy transfer or storage task allocation. A multi-criteria winning determination strategy may be employed to find an optimal assignment of a task for both the requesting customer(s) and crowdsourced service provider(s) that maximizes a joint utility function or a best trade-off Pareto solution. The customer(s) may be enabled to manually or automatically choose a final solution based on a predefined weighting scheme or preference information set by the customer(s). Optional task bundling may enable the allocating of multiple decomposable tasks as a bundle to a single service provider. In order to search for the "best" bid(s), the submitted bids are aggregated, processed and structured in the form of a data tree. After constructing the bids tree, standard deterministic or stochastic search algorithms may be used to identify a winning service provider. If so desired, a winning service provider may be tasked with a group/bundle of tasks; they may be elevated to a role of auctioneer to allocate these tasks to other service providers. The framework may also support multiple bidding languages, such as OR-bids or XOR-bids, to enable the bidders to bid for multiple tasks.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for operating an intelligent charging system for transferring energy to a user with an energy storage system, the method comprising:
    receiving, via a system controller of the intelligent charging system from a user interface of the user, a transfer request to schedule a transfer of electricity to the energy storage system of the user;
    broadcasting, via the system controller to a crowdsourced set of service providers, a solicitation for energy transfer bids for completing the transfer request to the user;
    receiving, via the system controller from a plurality of the service providers, multiple bid submissions for completing the transfer request;
    selecting an optimized bid submission from the received bid submissions using a multi-criteria selection strategy, the multi-criteria selection strategy including a joint utility maximization function and/or a trade-off Pareto solution;
    transmitting, via the system controller to a selected service provider of the plurality of the service providers associated with the optimized bid submission, a task allocation with instructions to provide the transfer request; and
    executing a transfer of electricity to the energy storage system.

2. The method of claim 1, wherein the optimized bid submission is selected using the joint utility maximization function calculated as:

$$\text{maximize } u(t)=\omega_c \cdot u_c(t)+\omega_s \cdot u_s(t)$$

where u(t) is a joint utility as a function of completing the transfer request as task t, $\omega_c$ is a user-defined customer weighting factor, $u_c(t)$ is a customer utility function of the user as a function of the task t, $\omega_s$ is a provider-defined service provider weighting factor, and $u_s(t)$ is a provider utility function of the selected service provider as a function of the task t.

3. The method of claim 2, wherein the customer utility function $u_c(t)$ is calculated as:

$$u_c(t) = \begin{cases} \beta_i imp_c(t) - \beta_{eta} ETA(t) - \beta_p pay_c(t) & \text{if } c \in EV \\ \beta_i imp_c(t) - \beta_p pay_c(t) & \text{if } c \in Gird \end{cases}$$

where $imp_c(t)$ is an expected impact on an energy storage device in the energy storage system of the user as a function of the task t, ETA(t) is an estimated time of arrival (ETA) of or an estimated time to reach the selected service provider, $pay_c(t)$ is a total cost in the optimized bid submission from the selected service provider to execute the task t, and $\beta_i$, $\beta_{eta}$, and $\beta_p$ are user-defined weights of impact, ETA, and payment.

4. The method of claim 3, wherein the provider utility function $u_s(t)$ is calculated as:

$$u_s(t) = \begin{cases} \alpha_p pay_s(t) - \alpha_d dis(t) - \alpha_i imp_s(t) & \text{if } s \in MSP \\ pay_s(t) & \text{if } s \in SSP \end{cases}$$

where $pay_s(t)$ is a total compensation the selected service provider will receive to execute the task t, dis(t) is a total distance the selected service provider will travel to reach the user, $imp_s(t)$ is an expected impact on an energy storage device of the selected service provider as a function of the task t, and $\alpha_p$, $\alpha_d$, and $\alpha_i$, are provider-defined weights of payment, distance, and impact.

5. The method of claim 1, wherein the optimized bid submission is selected using the trade-off Pareto solution including execution of a bi-objective optimization technique to visualize a Pareto-front tradeoff curve as a function of objective values and objective tradeoffs.

6. The method of claim 5, wherein the trade-off Pareto solution generates multiple best trade-off proposals, the method further comprising:
presenting, via the system controller to the user prior to transmitting the task allocation, the best trade-off proposals with a prompt to choose a selected best trade-off proposal from the best trade-off proposals; and
receiving, via the system controller from the user, the selected best trade-offs proposal, wherein the optimized bid submission is the selected best trade-offs proposal.

7. The method of claim 1, wherein the user includes multiple heterogeneous users, the transfer request includes multiple transfer requests from the heterogeneous users, and the optimized bid submission includes a request to bundle multiple select ones of the transfer requests.

8. The method of claim 1, further comprising:
generating, via the system controller responsive to selecting the optimized bid submission, a task agreement to complete the transfer request for the user by the selected service provider; and
transmitting the task agreement to the user and the selected service provider with a prompt to approve the task agreement.

9. The method of claim 1, further comprising:
receiving, via the system controller prior to broadcasting the solicitation for energy transfer bids, geolocation data indicative of a location of the user;
defining a geofence with a predefined size around the location of the user;
receiving, via the system controller, geopositional data indicative of respective locations of multiple registered service providers; and
deriving the crowdsourced set of service providers as a subset of the registered service providers located within the geofence.

10. The method of claim 1, further comprising:
receiving, via the system controller from a memory device, a priori data for the user and for the service providers associated with the multiple bid submissions; and
executing a tree data structure to locate predefined keys within the received a priori data, wherein selecting the optimized bid submission is further based on the predefined keys located within the received a priori data using the tree data structure.

11. The method of claim 1, further comprising receiving, via the system controller after transmitting the task allocation, a transfer confirmation that the transfer request was provided to the user by the selected service provider.

12. The method of claim 11, further comprising transmitting, via the system controller to the user and/or the selected service provider responsive to the received transfer confirmation, a prompt to evaluate the provisioning of the transfer request.

13. The method of claim 1, further comprising receiving, by the system controller, respective registration data files from the user and each service provider in the crowdsourced set of service providers.

14. An intelligent charging system for transferring energy to a user with an energy storage system, the intelligent charging system comprising:
a memory device storing registration information for multiple service providers;
a communications device operable to communicate with the service providers; and
a server-class computer with a system controller programmed to:
receive, from a user interface of the user via the communications device, a transfer request to schedule a transfer of electricity to the energy storage system of the user;
broadcast, to a crowdsourced set of the service providers via the communications device, a solicitation for energy transfer bids for completing the transfer request;
receive, from a plurality of the service providers via the communications device, multiple bid submissions for completing the transfer request;
select an optimized bid submission from the received bid submissions using a multi-criteria selection strategy, the multi-criteria selection strategy including a joint utility maximization function and/or a trade-off Pareto solution;
transmit, to a selected service provider of the plurality of the service providers associated with the optimized bid submission, a task allocation with instructions to provide the transfer request; and
executing a transfer of electricity to the energy storage system.

15. The intelligent charging system of claim 14, wherein the optimized bid submission is selected using the joint utility maximization function calculated as:

$$\text{maximize } u(t) = \omega_c \cdot u_c(t) + \omega_s \cdot u_s(t)$$

where u(t) is a joint utility as a function of completing the transfer request as task t, $\omega_c$, is a user-defined customer weighting factor, $u_c(t)$ is a customer utility function of the user as a function of the task t, $\omega_s$ is a provider-defined service provider weighting factor, and $u_s(t)$ is a provider utility function of the selected service provider as a function of the task t.

16. The intelligent charging system of claim 15, wherein the customer utility function is calculated as:

$$u_c(t) = \begin{cases} \beta_i imp_c(t) - \beta_{eta} ETA(t) - \beta_p pay_c(t) & \text{if } c \in EV \\ \beta_i imp_c(t) - \beta_p pay_c(t) & \text{if } c \in Gird \end{cases}$$

where $imp_c(t)$ is an expected impact on an energy storage device in the energy storage system of the user as a function of the task t, ETA(t) is an estimated time of arrival (ETA) of or an estimated time to reach the selected service provider, $pay_c(t)$ is a total cost in the optimized bid submission from the selected service provider to execute the task t, and $\beta_i$, $\beta_{eta}$, and $\beta_p$ are user-defined weights of impact, ETA, and payment.

17. The intelligent charging system of claim 16, wherein the provider utility function is calculated as:

$$u_s(t) = \begin{cases} \alpha_p pay_s(t) - \alpha_d dis(t) - \alpha_i imp_s(t) & \text{if } s \in MSP \\ pay_s(t) & \text{if } s \in SSP \end{cases}$$

where $pay_s(t)$ is a total compensation the selected service provider will receive to execute the task t, dis(t) is a total distance the selected service provider will travel to reach the user, $imp_s(t)$ is an expected impact on an energy storage device of the selected service provider as a function of the task t, and $\alpha_p$, $\alpha_d$, and $\alpha_i$ are provider-defined weights of payment, distance, and impact.

18. The intelligent charging system of claim 14, wherein the optimized bid submission is selected using the trade-off Pareto solution including execution of a bi-objective optimization technique to visualize a Pareto-front tradeoff curve as a function of objective values and objective tradeoffs.

19. The intelligent charging system of claim 18, wherein the trade-off Pareto solution generates multiple best trade-off proposals, and wherein the server-class computer is further programmed to:

presenting, via the system controller to the user prior to transmitting the task allocation, the best trade-off proposals with a prompt to choose a selected best trade-off proposal from the best trade-off proposals; and receiving, via the system controller from the user, the selected best trade-offs proposal, wherein the optimized bid submission is the selected best trade-offs proposal.

20. The intelligent charging system of claim 14, wherein the user includes multiple heterogeneous users, the transfer request includes multiple transfer requests from the heterogeneous users, and the optimized bid submission includes a request to bundle multiple select ones of the transfer requests.

* * * * *